Patented Nov. 30, 1937

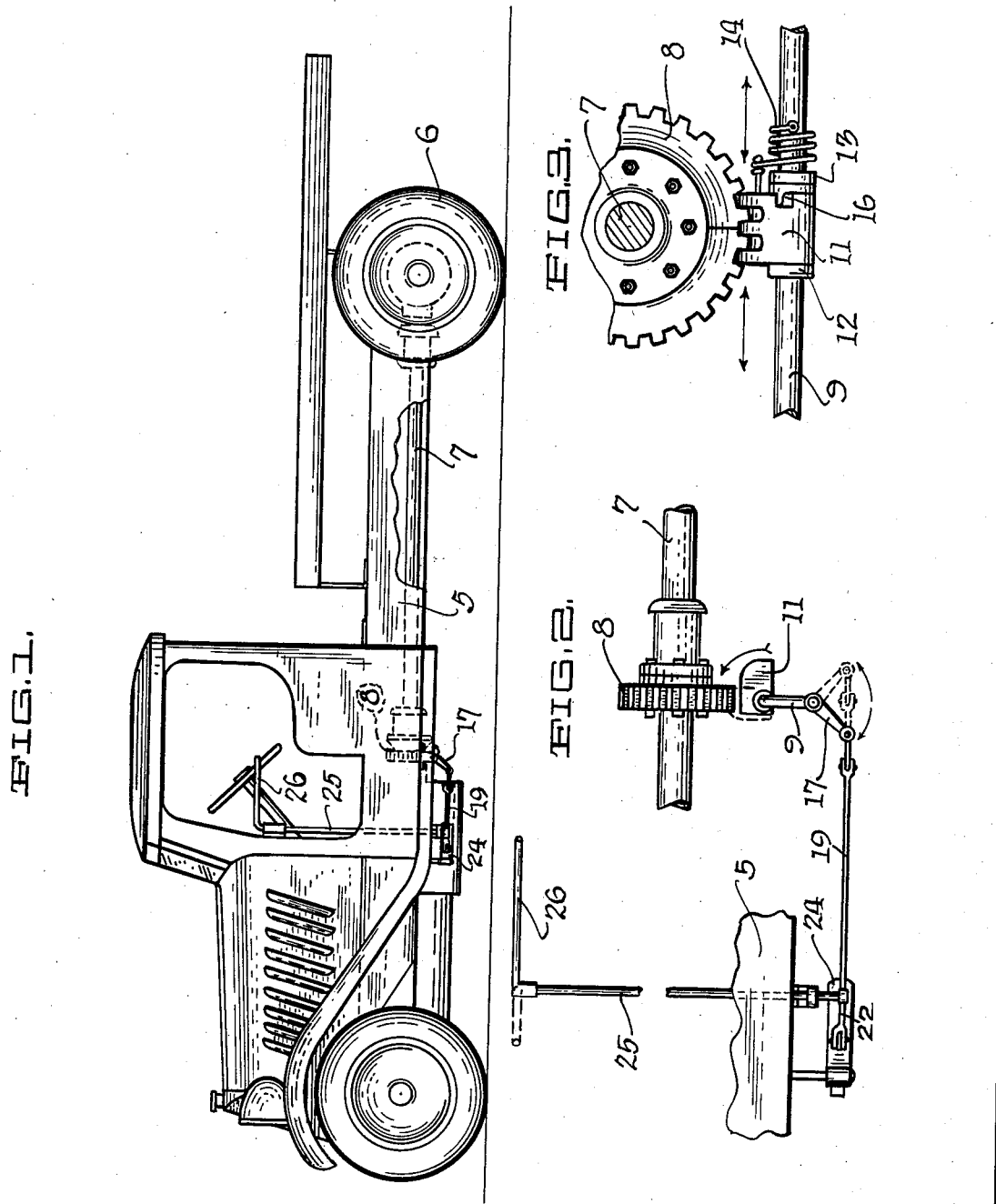

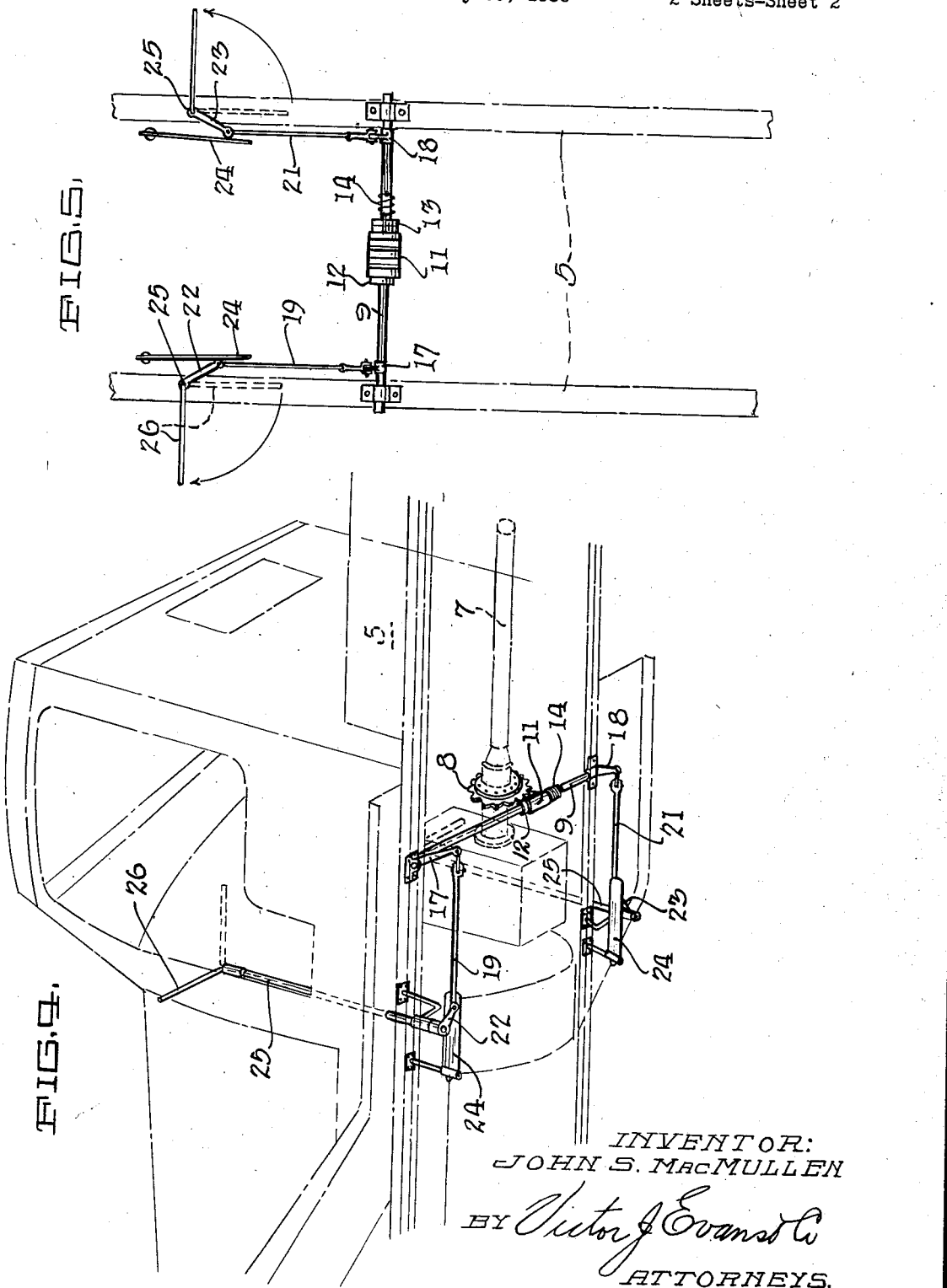
Nov. 30, 1937.  J. S. MacMULLEN.  2,100,970
AUTOMATIC SAFETY BRAKE FOR MOTOR VEHICLES
Filed July 30, 1936   2 Sheets-Sheet 2
INVENTOR:
JOHN S. MacMULLEN
ATTORNEYS.

2,100,970

UNITED STATES PATENT OFFICE 2,100,970

AUTOMATIC SAFETY BRAKE FOR MOTOR VEHICLES

John S. MacMullen, San Francisco, Calif.

Application July 30, 1936, Serial No. 93,496

6 Claims. (Cl. 188—31)

This invention relates to improvements in motor vehicle locking mechanisms, and has particular reference to means for manually locking a motor vehicle when the driver leaves the same unattended on hills and like places.

The principal object of the invention is to produce an attachment of this character that employs mechanism associated with the motor vehicle locking means, whereby the operator cannot leave the cab of the car without automatically locking the wheels against slipping or rotation.

A further object of the invention is to produce an attachment of the character described that is simple to construct, economical to manufacture, positive in operation, durable in character, and one that can be readily applied to the ordinary motor vehicle without materially altering the construction of the same.

Other objects and advantages will be apparent during the course of the following description.

In the accompanying drawings forming a part of this specification and in which like numerals are employed to designate like parts throughout the same, Fig. 1 is a side elevation of a truck having my invention applied thereto;

Fig. 2 is an enlarged fragmentary side elevation of my device showing the operation thereof, with the rod or rock shaft 9 shown in perspective;

Fig. 3 is an enlarged fragmentary detailed view showing the manner in which the locking action takes place;

Fig. 4 is a perspective view looking from beneath the truck showing the parts in locked position;

Fig. 5 is a top plan view of my device as the same would appear when installed upon the bare chassis.

Many severe accidents have occurred due to the fact that a vehicle left unattended on a grade has slipped its brakes and rolled away. With my improved attachment it is impossible for the driver to leave the cab without automatically locking the wheels.

In the accompanying drawings wherein for the purpose of illustration is shown a preferred embodiment of my invention, the numeral 5 designates the chassis of a vehicle having rear wheels 6 which are connected by the customary propeller shaft 7 to the transmission. It is upon the flange of the first universal joint of this propeller shaft 7 that I place a gear 8. Extending across the chassis at a point directly beneath the gear 8 is a rotatable bar or shaft 9 upon which is mounted a gear segment or dog 11 that is freely rotatable upon the shaft 9, between collars 12 and 13. A spring 14 secured to the shaft 9 and to the dog 11 tends to hold the segment in an operative position. A lug 16 formed upon the collar 13 engages the segment and limits the amount of movement which the spring 14 can cause, the purpose of which will later be seen. Secured to the ends of the rod 9 are arms 17 and 18 which are in turn connected to drag lengths 19 and 21, respectively. These are in turn pivoted to levers 22 and 23, respectively, and contact flat springs 24, the purpose of which will later be seen. The levers 22 and 23 are each connected to an upstanding rod 25, each of which is bent at the upper ends as shown at 26 and adapted to be in full line position of Fig. 5 when the device is in locked condition and the position of Fig. 2 when the device is in unlocked condition. The springs 24 maintain the parts in either locked or unlocked position. When the device is installed upon a car and the driver is about to leave the vehicle unattended, the parts will be in the position of Figs. 1 and 2, at which time the propeller shaft 7 and the gear 8 are not rotating, the segment 11 being in the full line position of Fig. 2. As soon as the driver attempts to leave the vehicle he must necessarily swing the lever 26 to the full line position of Figs. 4 and 5, and in so doing he will move the rod 9, thus throwing the segment 11 into the dotted line position of Fig. 2. Assuming that the teeth of the dog and the gear are in alignment there will be an automatic positive locking action between the chassis and the wheels. Should, however, the teeth of the dog be out of alignment with the gear, the spring 14, upon any motion of the vehicle will cause the dog to move into mesh with the teeth of the gear 6.

It will be apparent that I have devised an attachment which will perform all the functions set forth and one which will operate from either side of the cab and positively and automatically lock the wheels against rotation.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, in combination with a vehicle having a propeller shaft and wheels connected thereto, a gear associated with said propeller shaft, a gear segment pivotally mounted below said gear and adapted to engage the teeth of said gear, means for moving said segment into engagement with said gear, said means including a rod on which said segment is rotatably mounted, and a system of levers extending from said rod to the cab of said vehicle.

2. In a device of the character described, in combination with a vehicle having a propeller shaft and wheels connected thereto, a gear associated with said propeller shaft, a dog pivotally mounted below said gear and having teeth capable of engaging the teeth of said gear, means for moving said dog into engagement with said gear, said means including a rod pivotally mounted on said vehicle, spring connections between said rod and said dog causing said dog to bear against said gear when said rod is rotated in one direction, and a lever mounted on opposite sides of said cab, and extending across the doorway thereof, whereby said lever must be actuated when the operator leaves the cab of the vehicle, and connecting links between said last mentioned lever and said rod, whereby movement of said cab levers will actuate or rotate said rod.

3. In combination with a motor vehicle having a propeller shaft and an auxiliary gear associated therewith, means for locking said gear to prevent its rotation, levers on each side of the cab of said vehicle, said levers extending across the doorways of said cab and so positioned that they must be actuated to permit the operator to alight and thereby automatically locking said gear to prevent forward and rearward movement of the vehicle.

4. In combination with a vehicle having a propeller shaft and an auxiliary gear associated therewith, means for locking said gear to prevent its rotation, obstruction means on each side of the cab of said vehicle, said means extending across the doorways of the cab and so positioned that they must be actuated to permit the operator to alight, thereby automatically locking said gear and adapted to prevent forward and rearward movement of the vehicle.

5. In combination with a motor vehicle having a propeller shaft and an auxiliary gear associated therewith, means for locking said gear to prevent its rotation, levers on each side of the cab of said vehicle, said levers extending across the doorways of said cab and so positioned that they must be actuated to permit the operator to alight and thereby automatically locking said gear to prevent forward and rearward movement of the vehicle.

6. In combination with a vehicle having a propeller shaft and an auxiliary gear associated therewith, means for locking said gear to prevent its rotation, obstruction means on each side of the cab of said vehicle and so positioned that they must be actuated to permit the operator to alight, thereby automatically locking said gear and adapted to prevent forward and rearward movement of the vehicle.

JOHN S. MacMULLEN.